US009249862B2

(12) United States Patent
Oh

(10) Patent No.: US 9,249,862 B2
(45) Date of Patent: Feb. 2, 2016

(54) DIFFERENTIAL BEVEL GEAR SPEED REDUCER

(71) Applicant: Karen Park, Los Angeles, CA (US)

(72) Inventor: Dong Soo Oh, Seoul (KR)

(73) Assignee: Karen Park, Los Angeles, CA (US)

( * ) Notice: Subject to any disclaimer, the term of this patent is extended or adjusted under 35 U.S.C. 154(b) by 0 days.

(21) Appl. No.: 14/152,910

(22) Filed: Jan. 10, 2014

(65) Prior Publication Data

US 2014/0221147 A1 Aug. 7, 2014

(30) Foreign Application Priority Data

Jan. 14, 2013 (KR) ........................ 10-2013-0003857

(51) Int. Cl.
*F16H 1/36* (2006.01)
*F16H 1/46* (2006.01)

(52) U.S. Cl.
CPC ... *F16H 1/36* (2013.01); *F16H 1/46* (2013.01)

(58) Field of Classification Search
CPC ........................... F16H 57/038; F16H 2702/04
See application file for complete search history.

(56) References Cited

U.S. PATENT DOCUMENTS

| | | | | |
|---|---|---|---|---|
| 1,464,777 | A * | 8/1923 | Ross | 475/221 |
| 3,129,608 | A * | 4/1964 | Kenneth | F16H 1/222 416/169 R |
| 4,251,987 | A * | 2/1981 | Adamson | F02C 3/113 417/405 |
| 4,700,589 | A * | 10/1987 | Coronel | 475/6 |
| 4,817,464 | A * | 4/1989 | Korban et al. | 475/14 |
| 4,850,248 | A * | 7/1989 | Korban et al. | 475/14 |
| 5,178,028 | A * | 1/1993 | Bossler, Jr. | B64D 35/04 74/416 |
| 6,183,388 | B1 * | 2/2001 | Hawkins | F16H 1/36 475/336 |
| 7,452,304 | B2 * | 11/2008 | Hagan et al. | 475/298 |
| 8,235,862 | B2 * | 8/2012 | Sugitani | F16H 1/46 475/339 |
| 8,727,934 | B2 * | 5/2014 | Roussey | F16H 1/36 475/331 |
| 9,109,667 | B2 * | 8/2015 | Jeong | F16H 1/36 |
| 2015/0239527 | A1 * | 8/2015 | Huang | F16H 1/36 475/149 |

FOREIGN PATENT DOCUMENTS

| | | |
|---|---|---|
| JP | 4-331856 | 11/1992 |
| JP | 8-184364 | 7/1996 |
| KR | 20-1991-0002835 | 2/1991 |
| KR | 10-2001-0106047 | 11/2001 |

* cited by examiner

*Primary Examiner* — Derek D Knight
(74) *Attorney, Agent, or Firm* — Lee, Hong, Degerman, Kang & Waimey

(57) ABSTRACT

A differential Bevel gear speed reducer consisting of standard type gears, each of the standard type gears having a same tooth form and a same gear module value, wherein three identical pinion Bevel gears are located between an input Bevel gear and an output Bevel gear, revolution-inducing Bevel gears that have a same number of teeth, a same module value, and a same cone apex as the pinion Bevel gears are fixedly placed at an outer side of axes of the three pinion Bevel gears, an orbit Bevel gear that is engaged with the revolution-inducing Bevel gears is fixedly placed at inside of a housing, causing the pinion Bevel gears and the revolution-inducing Bevel gear to revolve along an orbit of the orbit Bevel gear as the input Bevel gear revolves, and the rotation of the input Bevel gear causes differential rotation of the output Bevel gear.

2 Claims, 2 Drawing Sheets

DIFFERENTIAL BEVEL GEAR SPEED REDUCER

CROSS-REFERENCE TO RELATED APPLICATIONS

Pursuant to 35 U.S.C. §119(a), this application claims the benefit of earlier filing date and right of priority to Korean Application No. 10-2013-0003857, filed on Jan. 14, 2013.

FIELD OF ART

The present invention relates to a differential gear speed reducer.

BACKGROUND ART

Currently, high speed reduction rotating power devices are generally classified into worm speed reducers and differential planetary gear speed reducers. With a simple structure, a worm speed reducer is easy to manufacture. But it has problems such as friction-induced wearing and heating, low efficiency, and less durability, which limits the scope of its use. A differential planetary speed reducer uses a profile shifted gear of which an amount of addendum modification (or addendum modification coefficient) is adjusted, which causes problems associated with noise, wear, and durability and it is difficult to manufacture the differential planetary speed reducer.
<Note: See glossary for an amount of addendum modification and addendum modification coefficient>

DESCRIPTION OF THE INVENTION

In order to solve various problems that occur as current differential planetary gear speed reducer uses a profile shifted gear by adjusting the amount of the addendum modification, it is the object of the present invention to manufacture a differential gear speed reducer made of only gears that are not profile shifted, thus making it easy to design and manufacture the gears and fundamentally solve the problems with the current planetary gear speed reducer.

Technical Problems to be Solved by the Present Invention

In the current differential planetary gear speed reducer, two different gears meshing with each other and having different number of mutually engaging teeth have the center of pitch circle fixed. Thus, in order to adjust the circumference of the pitch circle, it is unavoidable to adjust the amount of the addendum modification or the addendum modification coefficient. However, the present invention makes the centers of the pitch circles of two mutually engaging gears different, thereby manufacturing a differential speed reducer composed of the gears that are not profile shifted having the same module value and the same tooth form, thus meeting the requirements of mutual engagement without having to adjust the amount of addendum modification or the addendum modification coefficient.

Means of Solving the Problems

It is to convert the current structure of fixed center of rotation of differential planetary gears into a Bevel gear combination structure in which the centers of pitch circles of two mutually engaging gears are different and the circumference of each gear is set differently.

In order to mesh with each other properly, three Bevel gears, i.e., a pinion Bevel gear, an input Bevel gear, and an output Bevel gear, having different number of teeth respectively are made to have a same module value, a same tooth form, and a same plane for the axes of rotations of the three Bevel gears to be located, thus allowing the input Bevel gear and the output Bevel gear to rotate differently by as much as the difference in the number of teeth.

Effect of the Invention

It achieves high efficiency, lowers noise and improves durability as required by the industrial automation devices and various control devices. Only composed of the gears that are not profile shifted easy to design and process, it enables to supply mass production volume at low costs.

DETAILED DESCRIPTION FOR IMPLEMENTING THE INVENTION

Primary speed reduction, which is a speed reduction based on the proportion of the number of teeth, by the planetary gear is combined with secondary speed reduction, which is a differential speed reduction based on the difference in the number of teeth according to the present invention to maximize high speed reduction.

Figure 1:
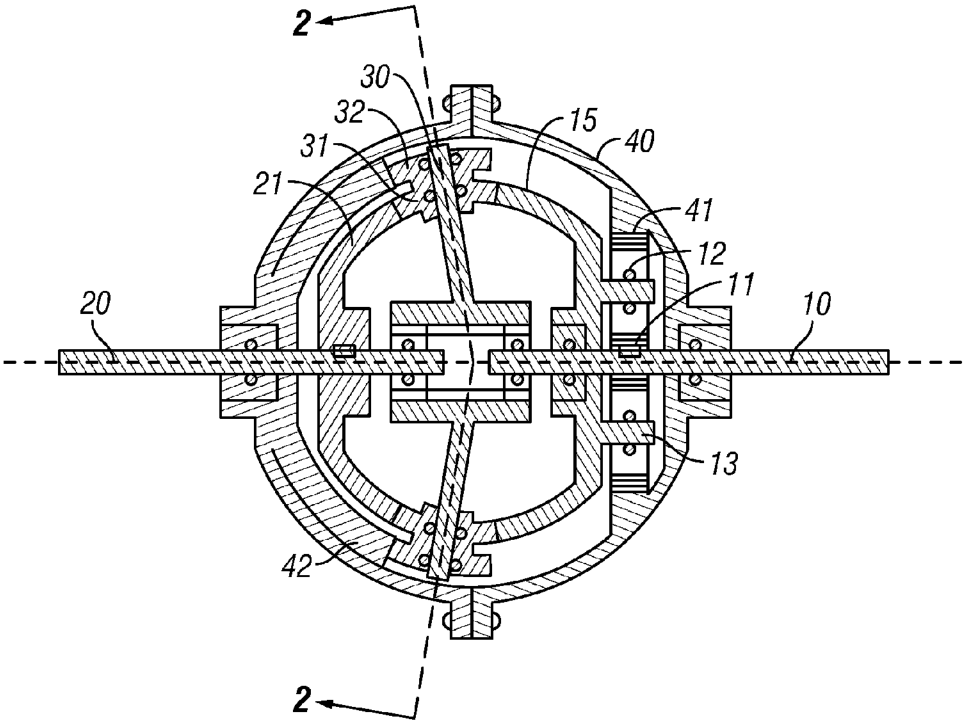
FIG. 1—A longitudinal cross-section of the present invention
Figure 2:
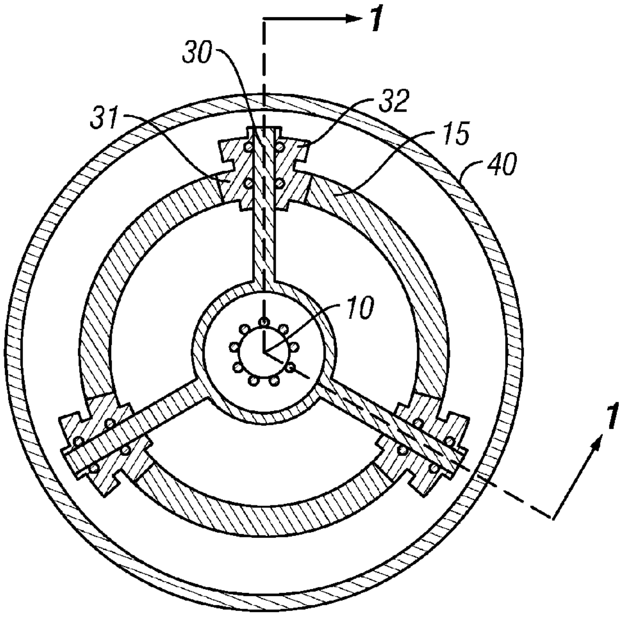
FIG. 2—A latitudinal cross-section of the present invention
Figure 3:
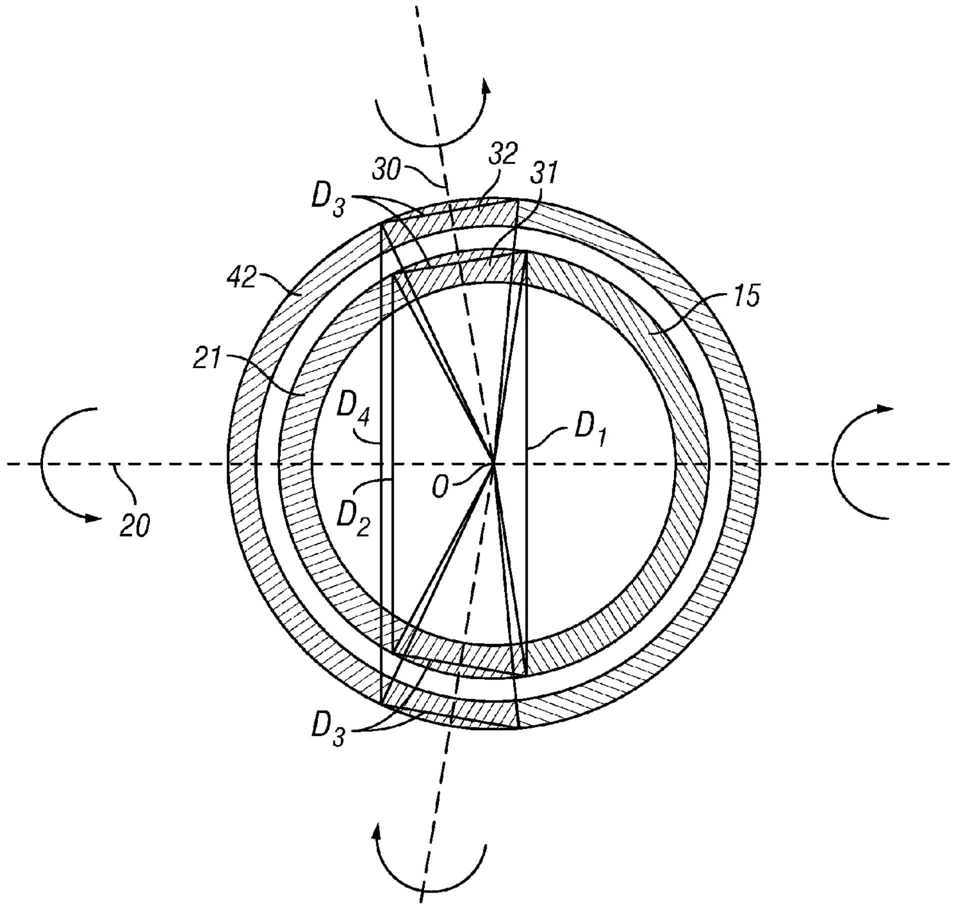
FIG. 3—Construction of a pitch circle and the direction of axis rotation

As illustrated in FIG. 1, FIG. 2, and FIG. 3, the differential gear speed reducer based on the difference in the number of teeth, according to the present invention, has an operational structure in which three identical pinion Bevel gears (31) engage between an input Bevel gear (15) and an output Bevel gear (21), under conditions that the input Bevel gear and the output Bevel gear have different numbers of teeth and cone apexes of all the gears meet at one point in the middle, and rotate in revolution to perform a sun-and-planet motion.

To begin with, the speed of said input Bevel gear (15) is reduced primarily based on the proportion of the number of teeth of the planetary gear as illustrated in FIG. 1.

The cone apex of three pinion Bevel gears (31) lies on the extended line of the rotational axis of the output Bevel (21) and the rotational axis of the input Bevel gear (15). The extended line of the pinion Bevel gear axis (30) meets the input and output rotational axes at an oblique angle.

The conditions of engagement among the pinion Bevel gear (31), the input Bevel gear (15) and the output Bevel gear (21) are: (i) module values of all the Bevel gears must be the same, (ii) tooth forms of all the Bevel gears are the same, (iii) when any two gears out of all the Bevel gears mesh with each other, a number of teeth of one gear and a number of teeth of the other gear must maintain an odd-and-even number relationship and the rotational axes of all the Bevel gears lie on the same plane, and (iv) the cone apexes of all the Bevel gears must meet at one point.

A revolution-inducing Bevel gear (32) having the same module, same number of teeth, and same cone apex as the pinion Bevel gear (31) is fixed-installed on the outer side of the pinion Bevel gear (31) to revolve together.

An orbit Bevel gear (42) that is engaged to said revolution-inducing Bevel gear (32) is fixed-installed inside the housing (40), and has the same module value, same tooth form and cone apex as the revolution-inducing Bevel gear (32). Thus, it plays a role of a rotation orbit of the revolution-inducing Bevel gear (32).

The sizes of pitch circuit diameters (D) of all the gears must be $D_3<D_2<D_1\leq D_4$ as illustrated in FIG. 3.

* Outside pitch circle is taken as the reference line.

Differential speed reduction ratio can be displayed as follows:

$$\text{Speed reduction ratio} = \frac{\text{Input Bevel gear pitch circle diameter}(D1) - \text{Output Bevel gear pitch circle diameter}(D2)}{\text{Output Bevel gear pitch circle diameter}(D2)}$$

If module=1 and diameter=D, from $m_0$=D/No. of teeth, No. of teeth=D. Thus, $$\text{Speed reduction ratio} = \frac{\text{No. of input Bevel gear teeth} - \text{No. of output Bevel gear teeth}}{\text{No. of output Bevel gear teeth}}$$

Spiral Bevel gear is more effective in preventing the occurrence of thrust caused by revolving of pinion Bevel gear.

As the input Bevel gear (15) rotates, the pinion Bevel gear (31) starts revolving following the orbit Bevel gear (42) along with the revolution-inducing Bevel gear (32). And, during 1 rotation of the input Bevel gear, it causes differential rotation of the output Bevel gear (21) by as much as the difference in the number of teeth between the input Bevel gear (15) and the output Bevel gear (21).

In FIG. 3, the cone apexes of all the gears meet at one point. If the input Bevel gear (15) rotates clockwise, the output Bevel gear (21) differential-rotates counterclockwise by as much as the difference in the number of teeth, while the pinion Bevel gear (31) rotates counterclockwise and revolves clockwise riding the orbit Bevel gear (42).

The internal space of the housing (40) is replete with lubricating oil, enabling to prevent wear and noise and perform cooling operation.

EXPLANATION OF REFERENCE NUMERALS

10 Input axis
11 Sun gear
12 Planetary pinion gear
13 Planetary pinion gear axis
15 Input Bevel gear
20 Output Bevel gear axis
21 Output Bevel gear
30 Pinion Bevel gear axis
31 Pinion Bevel gear
32 Revolution-inducing Bevel gear
40 Housing
41 Fixed internal gear
42 Fixed orbit Bevel gear

GLOSSARY $m_0$ Gear module
D Pitch circle diameter of a gear
$D_1$ Input Bevel gear pitch circle diameter
$D_2$ Output Bevel gear pitch circle diameter
$D_3$ Pinion Bevel gear pitch circle diameter
$D_4$ Orbit Bevel gear pitch circle diameter
O Bevel gear cone apex <Note>(1) Amount of addendum modification: Distance between the standard pitch line of a rack and the standard pitch line of a gear (2) Coefficient of addendum modification: The amount of addendum modification divided by a module value

What is claimed is:

1. A differential Bevel gear speed reducer consisting of first gears that are not profile shifted gears, each of the first gears having a same tooth form and a same gear module value, wherein:

three pinion Bevel gears among the first gears that are located between an input Bevel gear and an output Bevel gear, wherein the three pinion Bevel gears are structured such that distances between each of the three pinion Bevel gears are equal, and each respective rotational axis of the three pinion Bevel gears forms an equal angle with another rotational axis of any other of the three pinion Bevel gears, and the respective rotational axes of the three pinion Bevel gears meet at a center about which the three respective rotational axes of the three pinion Bevel gears rotate, first teeth of each of the three pinion Bevel gears mesh with second teeth of the input Bevel gear and third teeth of the output Bevel gear under the following condition:

(i) module values of all of the first gears are the same, (ii) tooth forms of all of the first gears are the same, (iii) cone apexes of the three pinion Bevel gears, the input Bevel gear, and the output Bevel gear meet at one point, (iv) when a number of the first teeth is an odd number, a number of the second teeth and a number of the third teeth are even numbers, and when the number of the first teeth is an even number, the number of the second teeth and the number of the third teeth are odd numbers, and (v) the respective rotational axes of the three pinion Bevel gears are located on a same plane, and the rotational axes of the three pinion Bevel gears are configured to meet an rotational axis of the input Bevel gear and an rotational axis of the output Bevel gear at an oblique angle, revolution-inducing Bevel gears among the first gears that have a same number of teeth, a same module value, and a same cone apex as the three pinion Bevel gears are fixedly placed at an outer side of said rotational axes of the three pinion Bevel gears, an orbit Bevel gear among the first gears that is engaged with the revolution-inducing Bevel gears is fixedly placed inside of a housing, causing the three pinion Bevel gears and the revolution-inducing Bevel gear to revolve along an orbit of the orbit Bevel gear as the input Bevel gear revolves, and the rotation of the input Bevel gear causes differential rotation of the output Bevel gear such that the output Bevel gear is rotated according to a difference between a number of teeth of the input Bevel gear and a number of teeth of the output Bevel gear per one rotation of the input Bevel gear according to a speed reduction ratio expressed as follows:

speed reduction ratio=(D1−D2)/D2, where D1 is the number of teeth of the input Bevel gear and D2 is the number of teeth of the output Bevel gear.

2. The differential Bevel gear speed reducer of claim 1, wherein when the input Bevel gear rotates clockwise, each of the three pinion Bevel gears rotates counterclockwise, the three pinion Bevel gears revolve along the orbit of the orbit Bevel gear clockwise, and the output Bevel gear rotates counterclockwise.

* * * * *